United States Patent
Douat et al.

(10) Patent No.: US 11,938,968 B2
(45) Date of Patent: Mar. 26, 2024

(54) TRAJECTORY DESIGN FOR IMAGE DATA ACQUISITION FOR OBJECT DETECTION/RECOGNITION

(71) Applicant: Robert Bosch GmbH, Stuttgart (DE)

(72) Inventors: Luiz Ricardo Douat, Leonberg (DE); Michael Erz, Muehlacker (DE); Jayanta Kumar Dutta, San Jose, CA (US); Marc Naumann, Sunnyvale, CA (US); Naveen Ramakrishnan, Redmond, WA (US)

(73) Assignee: Robert Bosch GmbH, Stuttgart (DE)

( * ) Notice: Subject to any disclaimer, the term of this patent is extended or adjusted under 35 U.S.C. 154(b) by 262 days.

(21) Appl. No.: 17/523,679

(22) Filed: Nov. 10, 2021

(65) Prior Publication Data
US 2023/0143963 A1  May 11, 2023

(51) Int. Cl.
*B60W 60/00* (2020.01)

(52) U.S. Cl.
CPC .... *B60W 60/0017* (2020.02); *B60W 60/0016* (2020.02); *B60W 60/00259* (2020.02); *B60W 2420/42* (2013.01); *B60W 2420/52* (2013.01); *B60W 2554/4045* (2020.02); *B60W 2554/4049* (2020.02)

(58) Field of Classification Search
None
See application file for complete search history.

(56) References Cited

U.S. PATENT DOCUMENTS

| | | | |
|---|---|---|---|
| 10,227,017 B2 | 3/2019 | Bae et al. | |
| 10,421,453 B1 | 9/2019 | Ferguson et al. | |
| 10,875,528 B2 | 12/2020 | Shalev-Shwartz et al. | |
| 11,181,926 B2 * | 11/2021 | Shalev-Shwartz | ......... G01C 21/3415 |
| 2015/0269622 A1* | 9/2015 | Kitagishi | ........... G06Q 30/0266 705/14.63 |
| 2015/0309510 A1* | 10/2015 | Cudak | ................... B60W 30/16 701/28 |
| 2019/0384994 A1 | 12/2019 | Frossard et al. | |
| 2020/0064837 A1 | 2/2020 | Zhang et al. | |
| 2020/0160532 A1 | 5/2020 | Urtasun et al. | |

OTHER PUBLICATIONS

Zhao et al., "Object Detection with Deep Learning: A Review", IEEE Transactions on Neural Networks and Learning Systems, 2019, pp. 3212-3232.

* cited by examiner

*Primary Examiner* — Abdhesh K Jha
*Assistant Examiner* — David Hatch
(74) *Attorney, Agent, or Firm* — Michael Best & Friedrich LLP

(57) ABSTRACT

A vehicle for collecting image data of a target object for generating a classifier. The vehicle includes an image sensor and an electronic processor. The electronic processor is configured to determine a plurality of potential trajectories of the vehicle, determine, for each of the plurality of potential trajectories of the vehicle, a total number of views including the target object that would be captured by the image sensor as the vehicle moved along the respective trajectory, and determine a key trajectory of the vehicle from the plurality of potential trajectories based on the total number of views including the target of the key trajectory.

19 Claims, 8 Drawing Sheets

TRAJECTORY DESIGN FOR IMAGE DATA ACQUISITION FOR OBJECT DETECTION/RECOGNITION

FIELD

Embodiments relate to vehicle trajectory design for object detection and recognition training.

BACKGROUND

Modern vehicles include various partially autonomous driving functions, for example adaptive cruise-control, collision avoidance systems, self-parking, and the like. Such functions depend on various object detection and segmentation algorithms.

SUMMARY

In order to achieve fully autonomous driving, improvements in object and activity classification are needed. Classifying objects and the activities that those objects are performing allows a vehicle to perform an autonomous driving function based on the vehicle's surrounding environment. In one example, a vehicle may classify (for example, via a convolutional neural network) an object in its surrounding environment as a neighboring vehicle and the activity that the neighboring vehicle is performing as a lane merger in front of the vehicle. In response to detecting that a neighboring vehicle is merging in front of the vehicle, the vehicle may slow down to allow the neighboring vehicle to merge. In another example, a vehicle may detect that an object in the vehicle's surrounding environment is a pedestrian and the activity that the pedestrian is performing is crossing the street in front of the vehicle. In response to detecting that a pedestrian is crossing the street in front of the vehicle, the vehicle may slow down or stop.

In developing classifiers for an object, a large amount of sensor data (for example, camera images and lidar point clouds) is relied upon. In order to properly develop a classifier, the sensor data needs to be not only vast, but also rich in content, presenting a high variability of features. Currently, data for a classifier may be collected randomly over time (for example, in hopes of attaining a large data variability), which may take an extensive amount of time.

Therefore, embodiments herein describe, among other things, a system and method for determining a key trajectory of a vehicle for collecting image data of a target object. A plurality of key trajectories are determined in such a way that a systematic coverage of the target object(s) at different distances and view angles (perspectives) is performed, providing rich information for the object detection training algorithms. Determining one or more key trajectories allows for a sufficient amount image data for classifier creation/training of a target object to be gathered in a reduced amount of time.

For example, one embodiment provides a vehicle for collecting image data of a target object for developing a classifier. The vehicle includes an image sensor and an electronic processor. The electronic processor is configured to determine a plurality of potential trajectories of the vehicle, determine, for each of the plurality of potential trajectories of the vehicle, a total number of views including the target object that would be captured by the image sensor as the vehicle moved along the respective trajectory, and determine a key trajectory of the vehicle from the plurality of potential trajectories based on the total number of views including the target of the key trajectory.

Another embodiment provides a method for collecting image data of a target object for developing a classifier. The method includes determining a plurality of potential trajectories of a vehicle including an image sensor, determining, for each of the plurality of potential trajectories of the vehicle, a total number of views including the target object that would be captured by the image sensor as the vehicle moved along the respective trajectory, and determining a key trajectory of the vehicle from the plurality of potential trajectories based on the total number of views including the target of the key trajectory.

Other aspects, features, and embodiments will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
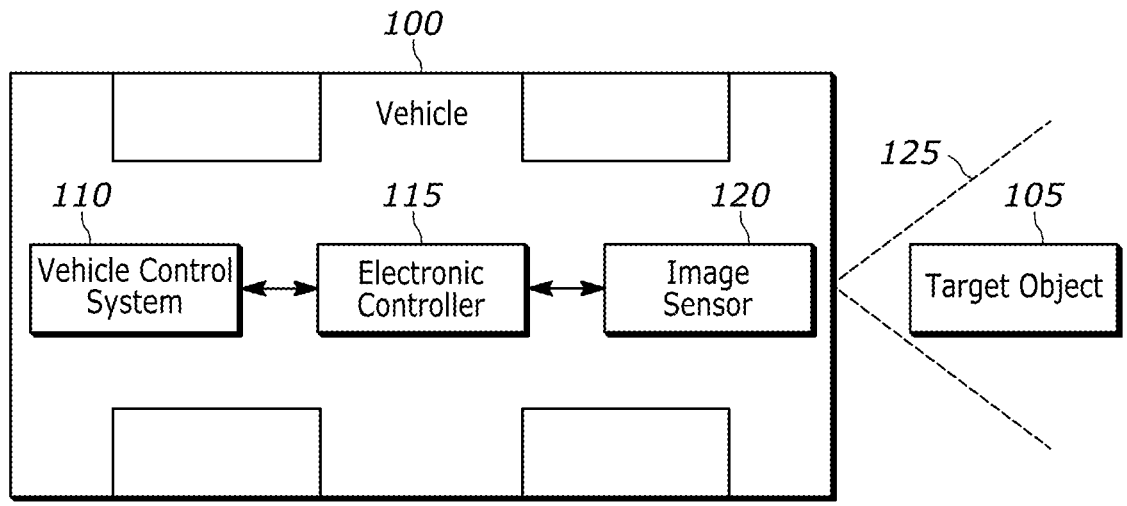
FIG. 1 is a block diagram of a vehicle for optimized image data collection of a target object according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software-based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components. Regardless of how they are combined or divided, hardware and software components may be located on the same computing device or may be distributed among different computing devices connected by one or more networks or other suitable communication links.

For ease of description, some of the example systems presented herein are illustrated with a single exemplar of each of its component parts. Some examples may not describe or illustrate all components of the systems. Other embodiments may include more or fewer of each of the illustrated components, may combine some components, or may include additional or alternative components.

FIG. 1 illustrates a vehicle 100 for collecting image data of a target object 105 for generating a classifier. The vehicle 100, although illustrated as a four-wheeled vehicle, may encompass various types and designs of vehicles. For example, the vehicle 100 may be an automobile, a motorcycle, a truck, a bus, a semi-tractor, drone, and others. The vehicle 100 may be, at least partially, autonomous. The target object 105 may be any kind of physical object including, but not limited to, another vehicle, a human being, an animal, and the like.

In the example illustrated, the vehicle 100 includes several hardware components including a vehicle control system 110, an electronic controller 115, and an image sensor 120. The electronic controller 115 may be communicatively connected to the vehicle control system 110 and image sensor 120 via various wired or wireless connections. For example, in some embodiments, the electronic controller 115 is directly coupled via a dedicated wire to each of the above-listed components of the vehicle 100. In other embodiments, the electronic controller 115 is communicatively coupled to one or more of the components via a shared communication link such as a vehicle communication bus (for example, a controller area network (CAN) bus) or a wireless connection. It should be understood that each of the components of the vehicle 100 may communicate with the electronic controller 115 using various communication protocols. The embodiment illustrated in FIG. 1 provides but one example of the components and connections of the vehicle 100. Thus, the components and connections of the vehicle 100 may be constructed in other ways than those illustrated and described herein.

Figure 2:
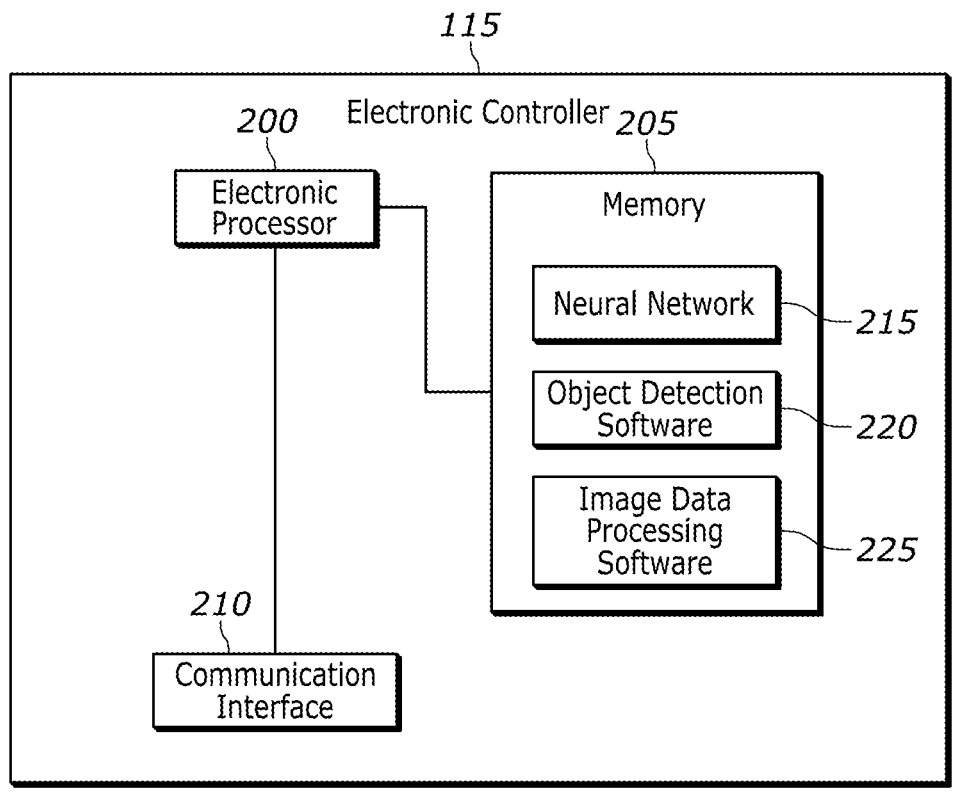
FIG. 2 is a block diagram of an electronic controller of the system of FIG. 1 according to some embodiments.

FIG. 2 is a block diagram of one example embodiment of the electronic controller 115 of the system 100 of FIG. 1. The electronic controller 115 includes a plurality of electrical and electronic components that provide power, operation control, and protection to the components and modules within the electronic controller 115. The electronic controller 115 includes, among other things, an electronic processor 200 (such as a programmable electronic microprocessor, microcontroller, or similar device), a memory 205 (for example, non-transitory, machine readable memory), and a communication interface 210. The electronic processor 200 is communicatively connected to the memory 205 and the communication interface 210. The electronic processor 200, in coordination with the memory 205 and the communication interface 210, is configured to implement, among other things, the methods described herein.

The electronic controller 115 may be implemented in several independent controllers (for example, programmable electronic controllers) each configured to perform specific functions or sub-functions. Additionally, the electronic controller 115 may contain sub-modules that include additional electronic processors, memory, or application specific integrated circuits (ASICs) for handling communication functions, processing of signals, and application of the methods listed below. In other embodiments, the electronic controller 115 includes additional, fewer, or different components.

Figure 4:
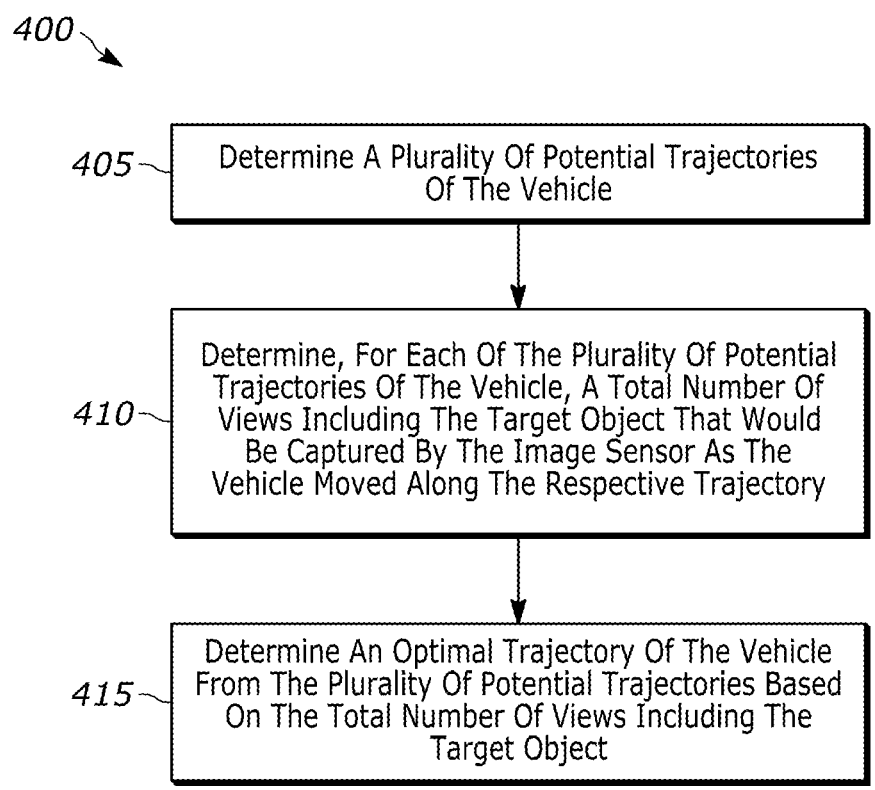
FIG. 4 is a flowchart of a method of determining a key trajectory for collecting image data of a target object performed by the system of FIG. 1 for generating a classifier of the target object according to some embodiments.

The memory 205 of the electronic controller 115 includes software that, when executed by the electronic processor 200, causes the electronic processor 200 to perform, for example, the method 400 illustrated in FIG. 4. In some embodiments, the memory 205 includes a neural network 215, an object detection software 220, and/or image data processing software 225. The neural network 215 may be a deep neural network (for example, a convolutional neural network (CNN) or a recurrent neural network (RNN)). In one example, the neural network 215 analyzes image data from the image sensor 120 to classify an object in the vehicle's surrounding environment (for example, the target object 105). In some embodiments, the neural network 215 is trained to classify objects. In some embodiments, the electronic processor 200, when executing the object detection software 220, uses machine learning techniques to detect, in an image received from the image sensor 120 one or more objects (for example, the target object 105) within the field of view 125 of the vehicle 100. For example, the object detection software 220 may include a convolutional neural network that has been trained to recognize vehicles, people, animals, a combination of the foregoing, and the like. The electronic processor 200, when executing the image data processing software 225, determines image data from the image sensor 120 that is associated with an object detected in an image from the image sensor 120 (for example, the target object 105) using the object detection software 220.

Figure 3:
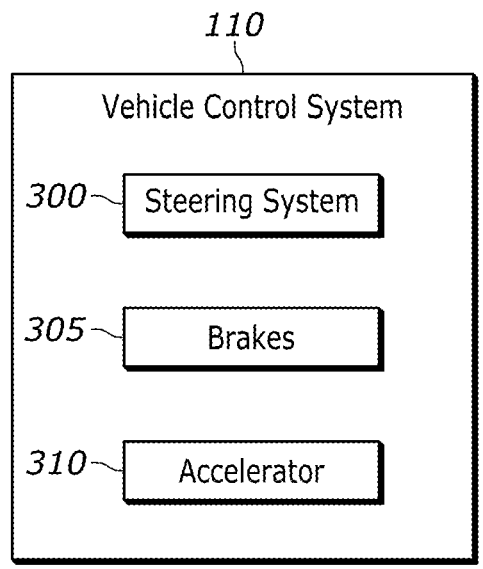
FIG. 3 is a block diagram of a vehicle control system included in the system of FIG. 1 according to some embodiments.

FIG. 3 illustrates an example of the vehicle control system 110. The vehicle control system 110 includes components involved in the autonomous or manual control of the vehicle 100. For example, in some embodiments, the vehicle control system 110 includes a steering system 300, brakes 305, and an accelerator 310. The embodiment illustrated in FIG. 3 provides but one example of the components of the vehicle control system 110. In other embodiments, the vehicle control system 110 includes additional, fewer, or different components.

Returning to FIG. 1, the image sensor 120 is configured to capture physical information of an object (for example, the target object 105) within a field of view 125 of the sensor 120. The image sensor 120 may be, for example, a camera, a lidar sensor, a radar sensor, or some combination thereof. The image sensor 120, or components thereof, may be externally mounted/integrated to a portion of the vehicle 100 (such as on a side mirror or a trunk door). Alternatively, the image sensor 120, or components thereof, may be internally mounted/integrated within the vehicle 100 (for example, positioned by the rearview mirror).

FIG. 4 illustrates an example method 400 of determining a key trajectory of a vehicle (for example, vehicle 100) for collecting image data of the target object 105 for developing a classifier. As an example, the method 300 is explained in terms of the electronic controller 110, in particular the electronic processor 200. However, portions of the method 300 may be distributed among multiple devices (for example, one or more additional control units/controllers/processors of or connected to the vehicle 100).

At step 405, the electronic processor 200 determines a plurality of potential trajectories of the vehicle 100. Each of the potential trajectories of the vehicle 100, in particular, is determined such that the image sensor 120 of the vehicle 100 captures image information of the target object 105 when the vehicle 100 is moved along the particular trajectory proximate to the target object 105 (for example, within 100 meters of the target object 105). The particular locations of the target object 105 and of the vehicle 100 relative to each other may be determined, for example, via analysis of an image captured by the image sensor 120 and/or via a GPS of the vehicle 100 and/or of the target object 105. The potential trajectories may be linear piecewise trajectories (for example, the trajectories 502A-502C of FIG. 5A where no turns are included), nonlinear (for example, trajectories 504A-504C of FIG. 5B where turns are included), or some combination thereof. Particular characteristics of the trajectories (for example, a distance of travel, duration, a speed, a proximate distance from the target object 105, nonlinear or linear, number of waypoints, and the like) may be customized and set (for example, via a user) and the electronic processor 200 may determine potential trajectories based on such settings.

At step 410, the electronic processor 200 determines, for each of the plurality of potential trajectories of the vehicle 100, a total number of views including the target object 105 that would be captured by the image sensor 120 as the vehicle 100 moved along the respective trajectory. At step 415, the electronic processor 200 determines a key trajectory of the vehicle 100 from the plurality of potential trajectories based on the total number of views including the target object 105. The total number of views is determined, for example, based on an image acquisition frequency of the image sensor 120 (i.e. how often an image is captured by the image sensor 120), the field of view 125 of the image sensor 120, and the speed of the vehicle 100. In some embodiments, the total number of views may be a total number of varied (distinct) views of the target object 105. The key trajectory may be further selected based on a total number of different distances from the target object 105, a total number of different perspective angles of the target object 105, or both. In some embodiments, the key trajectory is determined based on previously collected image data of the target object 105. The key trajectory may be generated, for example, such that image data corresponding to different distances and/or perspective angles of the target object 105 that was not previously collected is collected. Following the determination of the key trajectory of the vehicle 100, the electronic processor 200 may repeat the method 400 to determine another key trajectory.

In some embodiments, the electronic processor 200 is configured to guide the vehicle 100 along the determined key trajectory (for example, via one or more commands to the vehicle control system 110) so that image data of the target object 105 is collected. In embodiments where the vehicle 100 is not autonomous or only partially autonomous, the electronic processor 200 may provide indications to help guide a driver of the vehicle 100 to steer the vehicle 100 along the key trajectory (for example, visual indications may be displayed via a vehicle guidance interface on a display of the vehicle 100, which is not shown). As the vehicle moves along the key trajectory image data is collected via the sensor 120. Following the collection of the image data, for example, image data of the target object 105, the electronic processor 200, in some embodiments, creates and/or trains a classifier of the target object 105 for use in object detection (for example, a classifier of the object detection software 220). In some embodiments, the electronic processor 200 creates and/or trains a neural network (for example, a neural network of the neural network software 215).

Figure 5A:
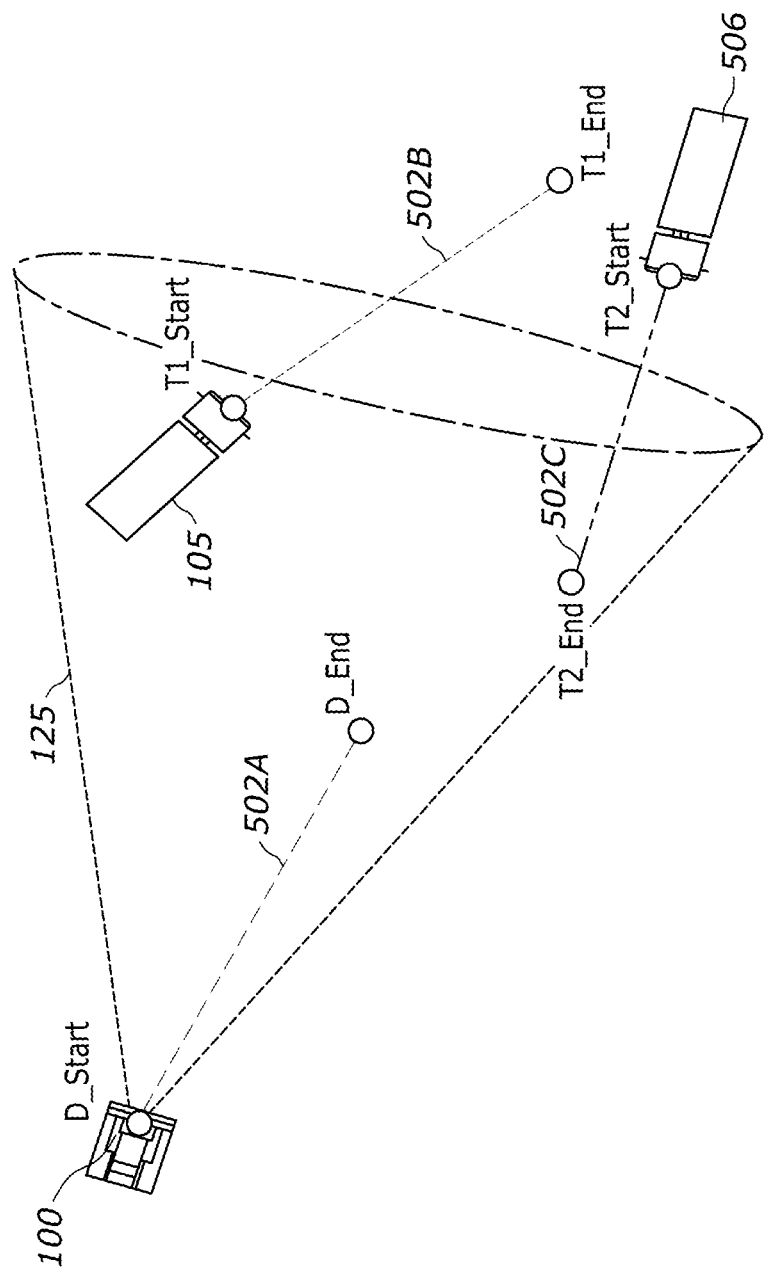
FIG. 5A is an illustration of a potential trajectory of the vehicle system of FIG. 1 according to some embodiments.
Figure 5B:
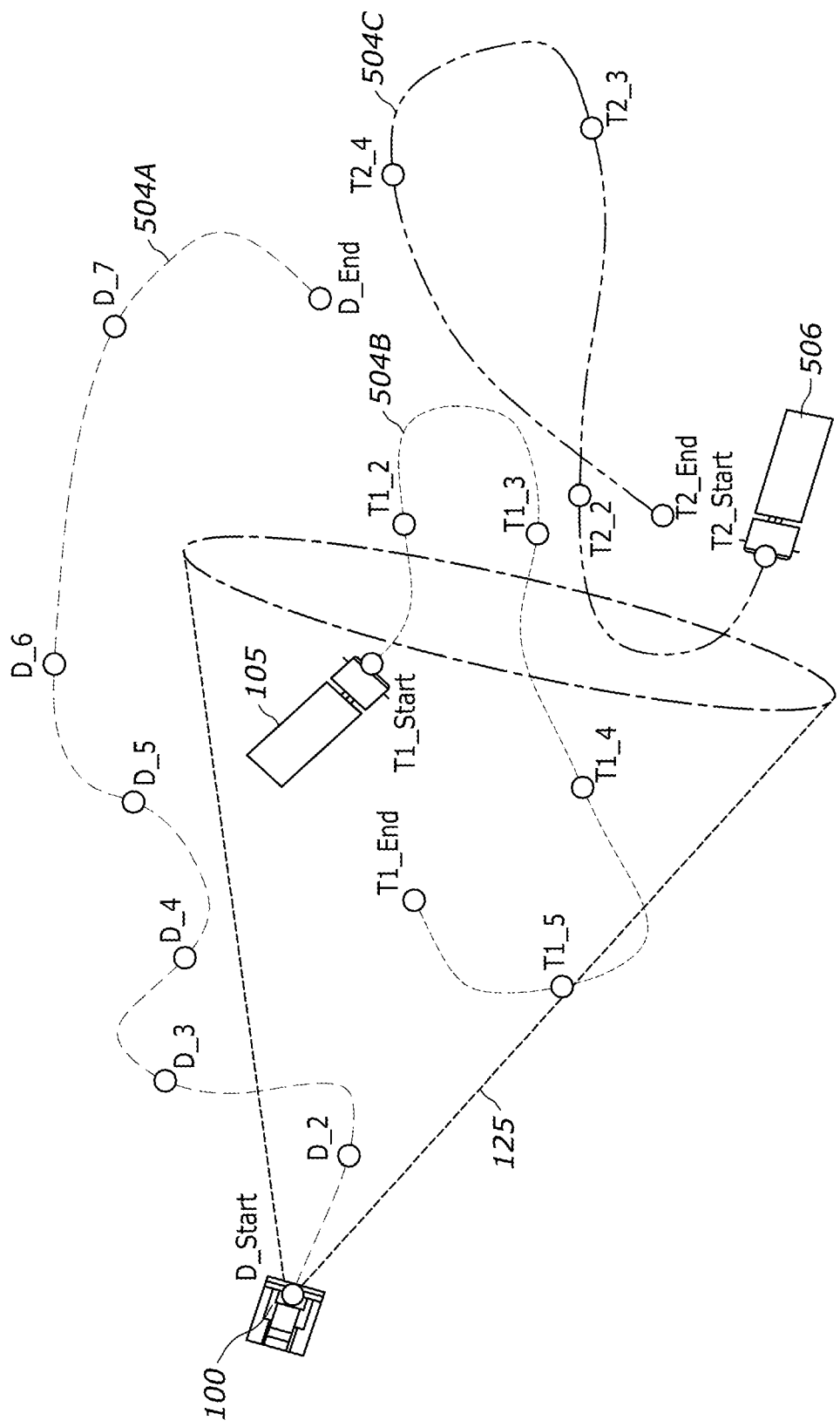
FIG. 5B is an illustration of a potential trajectory of the vehicle system of FIG. 1 according to some embodiments.

FIGS. 5A and 5B each illustrate of a potential trajectory of the vehicle 100 determined at block 402 of the method 400 of FIG. 4 according to some embodiments. As mentioned above, FIG. 5A illustrates a potential piecewise linear trajectory 502A of the vehicle 100 while FIG. 5B illustrates a potential nonlinear trajectory 504A. In some embodiments, the electronic processor 200 is further configured to, for each of the plurality of potential trajectories of the vehicle 100, determine a plurality of potential trajectories of the target object 105 (for example, as illustrated in FIGS. 5A and 5B, trajectories 502B and 504B respectively). The electronic processor 200 then determines a key trajectory of the target object 105 corresponding to the key trajectory of the vehicle 100. In some embodiments, the electronic processor 200 is further configured to determine, for each of the potential trajectories of the vehicle 100, a plurality of potential trajectories of a second target object (for example, trajectories 502C and 504C of target object 506 of FIGS. 5A and 5B respectively). The electronic processor 200 then determines a key trajectory of the second target object 506 corresponding to the key trajectory of the vehicle 100. The second target object 506 may be similar or identical to the target object 105. In embodiments where there are multiple target objects (for example, both target objects 105 and 506), the electronic processor 200 may determine potential trajectories of the vehicle 100 based on the potential trajectories of only some of the multiple target objects. Such cases may be, for example, where the target object 105 moves while the target object 506 remains stationary.

In some embodiments, the electronic processor 200, following determining a key trajectory, generates a threedimensional (3D) histogram plotting the total number of views (images) of the target object for one or more determined key trajectories of the vehicle 100. FIGS. 6A-F each illustrate a 3D histograms 600A-600F respectively. Each of the 3D histograms 600A-600F includes plots of a number of views of the target object 105 (Z-axis 602A-F respectively) captured for a plurality of key trajectories generated by the electronic processor 200. Each of the histograms 600A-600F includes a grid base that includes a target object visualization distance (the distance of the image sensor 120 from the target object 105) on one axis (X-axis 604A-F respectively) and the target object perspective angle (the angle of view of the target object 105 from the image sensor 120) on the other axis (Y-axis 606A-606F respectively). "N" indicates the number of key trajectories plotted on a respective histogram 600A-600F.

The grid base of the histogram 600A-600F visually reflects an image data profile of the target object 105. As the vehicle 100 moves along a key trajectory, the sensor 120 captures image data of the vehicle from a plurality of different distance and perspective angles. As the vehicle 100 moves along more key trajectories, the image sensor 120 collects more varied image data of the target object 105 (i.e., the number of captured views from particular visualization distances and perspective angles of the target object 105). With varied image data, a more complete image profile of the physical characteristics of the target object 105 is created.

Figure 6A:
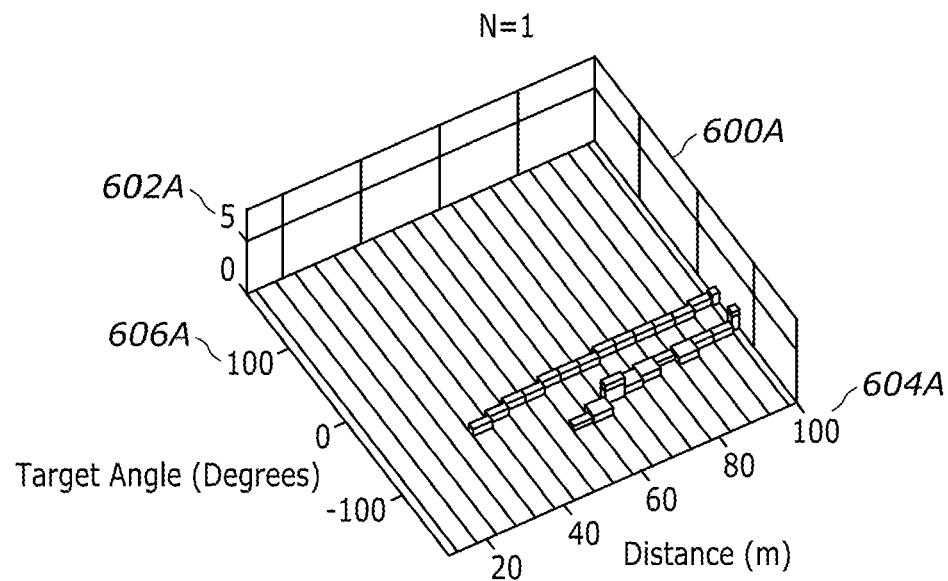
FIG. 6A is 3D histogram representing a number of views of a target object when the vehicle of FIG. 1 travels along a key trajectory according to some embodiments.
Figure 6B:
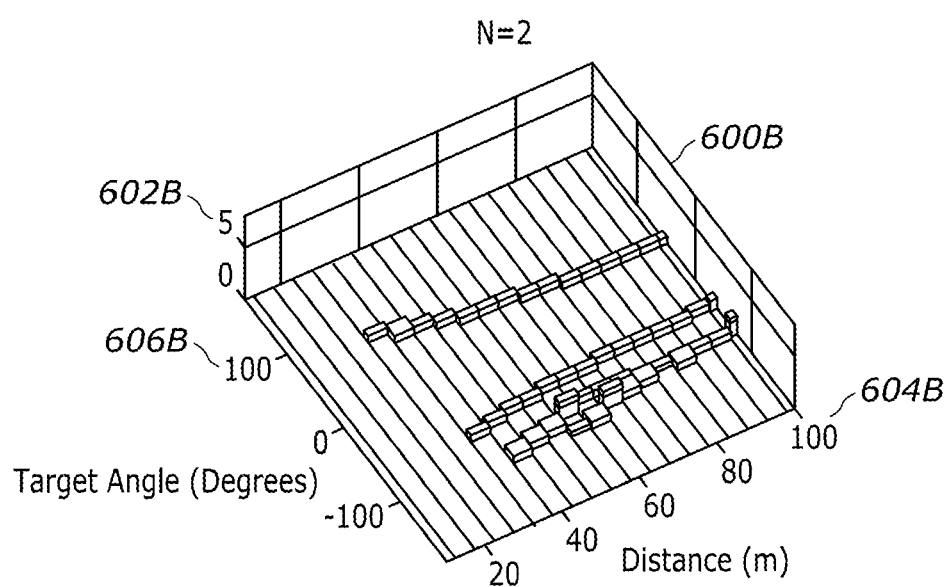
FIG. 6B is 3D histogram representing a number of views of a target object when the vehicle of FIG. 1 travels along a key trajectory according to some embodiments.
Figure 6C:
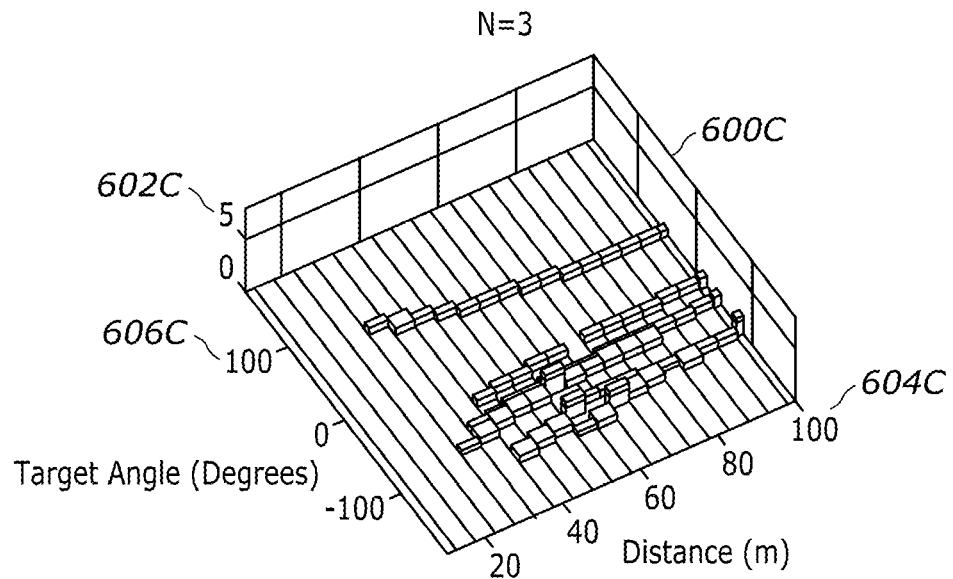
FIG. 6C is 3D histogram representing a number of views of a target object when the vehicle of FIG. 1 travels along a key trajectory according to some embodiments.
Figure 6D:
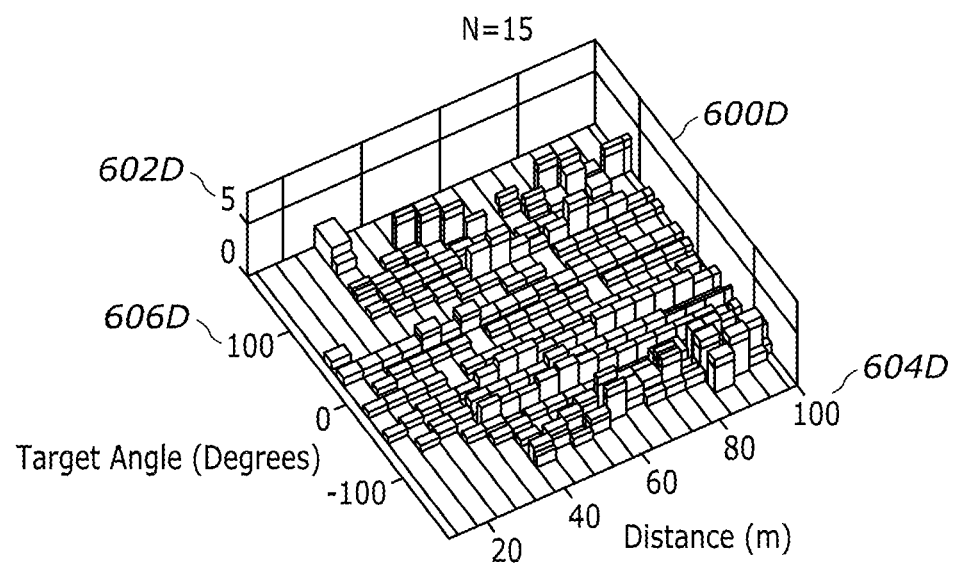
FIG. 6D is 3D histogram representing a number of views of a target object when the vehicle of FIG. 1 travels along a key trajectory according to some embodiments.
Figure 6E:
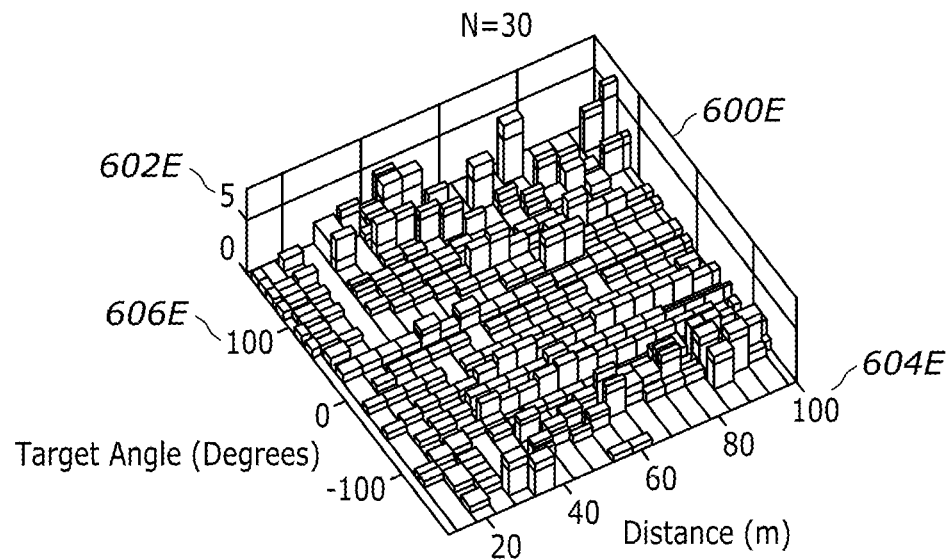
FIG. 6E is 3D histogram representing a number of views of a target object when the vehicle of FIG. 1 travels along a key trajectory according to some embodiments.
Figure 6F:
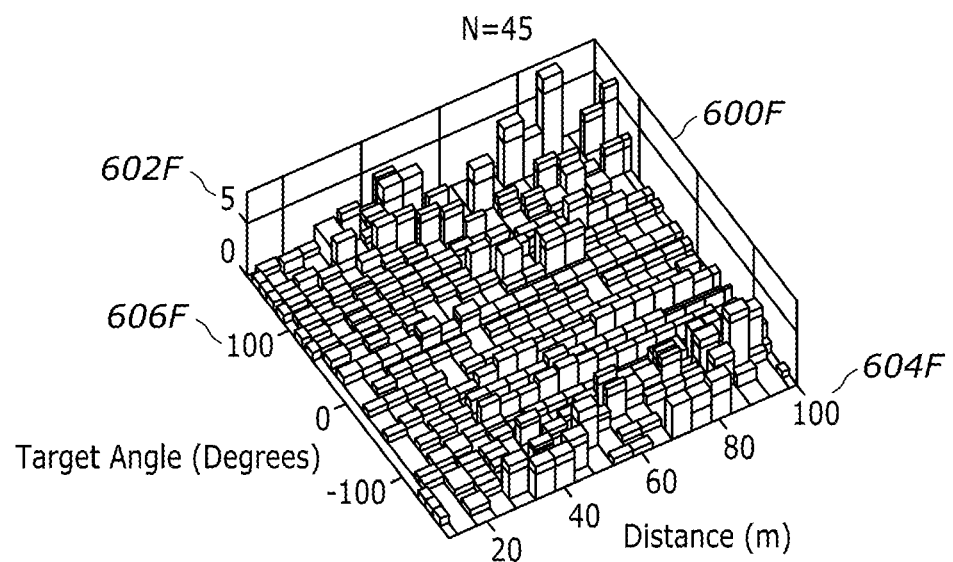
FIG. 6F is 3D histogram representing a number of views of a target object when the vehicle of FIG. 1 travels along a key trajectory according to some embodiments.

For example, as shown in FIG. 6A, a number of distinct views captured following the vehicle 100 moving along one key trajectory are plotted on the histogram 600A according to their respective visualization distances and perspective angles of the target object 105. As the vehicle 100 moves along more key trajectories to collect more image data, the number of distinct views of the target object 105 increases. This is visually reflected in the decreased number of empty bins of the base of the histogram 600A-600F as the vehicle 100 moves along more key trajectories. As illustrated in histogram 600F, after collecting image data of the target object 105 as the vehicle 100 moves along 45 key trajectories, the base of the histogram 600F more completely filled (as compared to the other histograms 600A-600E) with corresponding views of the target object 105 at various distances and corresponding perspective angles.

A cost function is used to in the determination of key trajectories of the vehicle 100 and/or number of key trajectories. In one example, the cost function is a standard deviation divided by the average number of views of the target object 105 for a respective trajectory. This criteria may be weighted and summed with a function of the total duration of the respective trajectory. Another cost function may be a number of empty grid elements in the histogram 600A-600F. In other embodiments, another technique used is minimizes a Kullback-Leibler (KL) divergence between the (normalized) histogram 600A-600F and a uniform distribution (in other words, maximize entropy of the normalized histogram 600A-600F). Alternative and/or additional cost functions may be utilized. For example, a sum of shortfall for angle and distance combinations below a certain threshold may be used.

Figure 7:
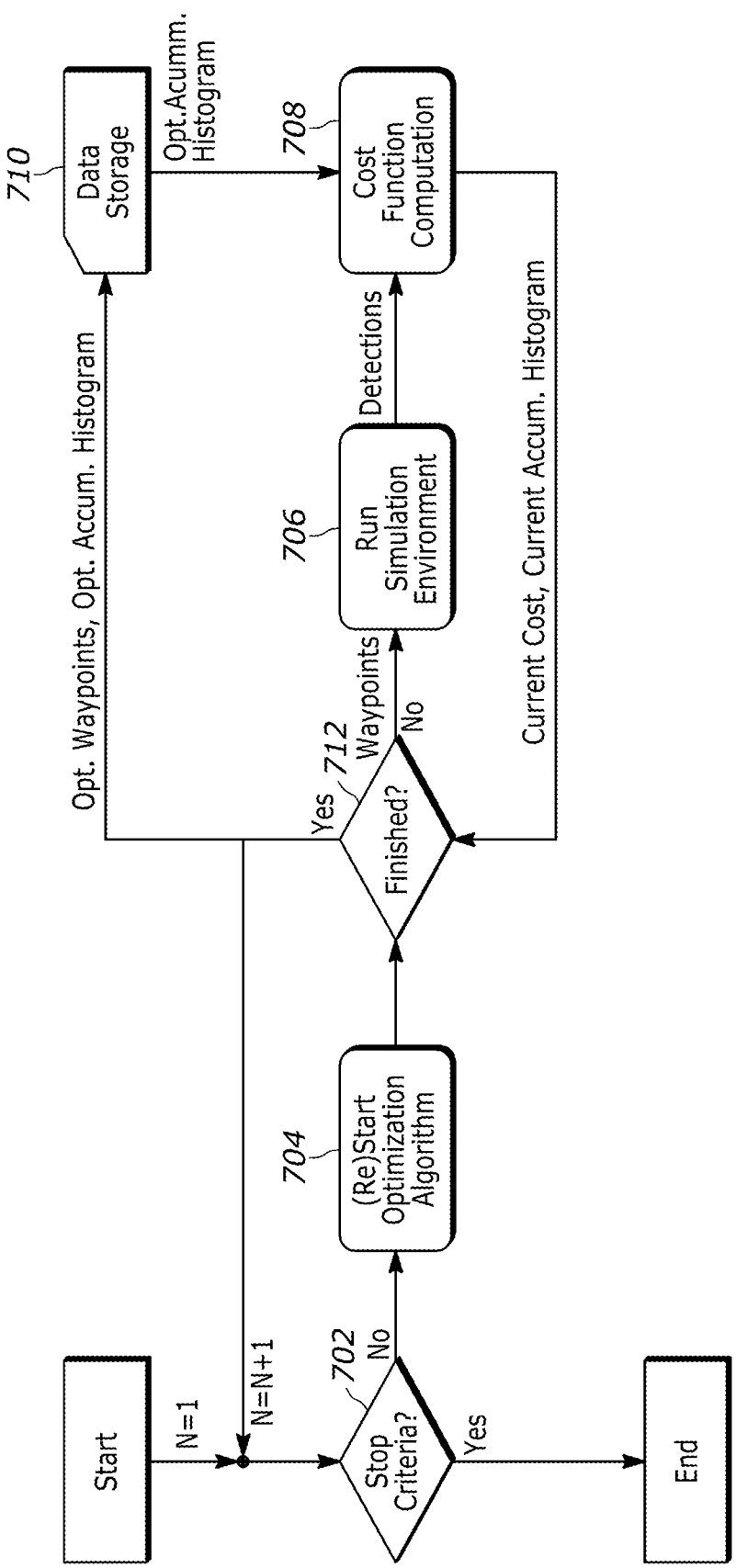
FIG. 7 is a flowchart of a method of a generating a 3D histogram representing a number of views of a target object of FIG. 1 according to some embodiments.

FIG. 7 is a flowchart of a method 700 of a generating a 3D histogram of key trajectories (for example, histograms 600A-600F of FIG. 6) implemented, for example, by the electronic processor 200. In the example shown, the method 700 includes a stop criteria (block 702) for setting a number of key trajectories generated via the optimization algorithm (block 704). A stop criteria may be, for example, a fixed number of iterations (N) (for example, a fixed number of key trajectories), a maximum simulation time, or a function of the related histogram 600A-600F (for example, a coverage percentile of the base of the histogram 600A-600F). After the optimization algorithm starts (block 704), the electronic processor 200 performs a simulation (block 706) of the vehicle 100 moving along a determined trajectory proximate to the target object 105. When the target object 105 is determined to be within the field of view 125 of the sensor 120 as the vehicle 100 moves along the determined trajectory, a captured view of the target object 105 is counted. The positions of the vehicle 100 and the target object 105 are also determined and stored with the corresponding captured view. The simulation ends when an end waypoint of the trajectory is reached.

It should be understood that, in some embodiments, a sequence of waypoints determined by the processor 200 when generating a key trajectory is computed by a different optimization algorithm (for examples, a shortest path algorithm)

At block 708, the electronic processor 200 computes all the distances and relative positions of the detected target object 105 with respect to the coordinate frame of the image sensor 120. This information is used, for example, to create a 3D histogram having in its base a grid of target distances in one axis and perspective angles in the other axis (for example, histograms 600A-600F of FIGS. 6A-6F). A resolution of the grid may be adjusted, in some embodiments, based on the particular target object 105. For example, for a target object 105 that changes visually with a change in perspective angle and/or distance, the histogram may be set to have a finer resolution. The electronic processor 200 may also calculate a cost function (block 708) based on the number of empty grids (missing "distance versus target angle" pairs). The histogram from the previous state (N−1), if stored, is added to the current histogram and the new histogram is stored (block 710) as the current accumulated histogram after the simulation is completed. The current accumulated histogram is then used to compute the current cost function and the electronic processor 200. When the optimization is completed (block 712), the electronic processor returns to block 702. The resulting optimal trajectories are used (for example, by the electronic processor 200) to steer the vehicle 100 so as to capture image data from the target object 105.

In the foregoing specification, specific embodiments and examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A vehicle for collecting image data of a target object for developing a classifier, the vehicle comprising:
    an image sensor; and
    an electronic processor configured to
        determine a plurality of potential trajectories of the vehicle,
        determine, for each of the plurality of potential trajectories of the vehicle, a total number of views including the target object that would be captured by the image sensor as the vehicle moved along the respective trajectory,
        determine a key trajectory of the vehicle from the plurality of potential trajectories based on the total number of views including the target of the key trajectory, and
        control the vehicle for movement along the key trajectory.

2. The vehicle of claim 1, wherein the key trajectory is further selected based on a total number of different: distances from the target object.

3. The vehicle of claim 1, wherein the key trajectory is further selected based on a total number of different perspective angles of the target object of the total number of views.

4. The vehicle of claim 1, wherein the electronic processor is further configured to, for each of the plurality of potential trajectories of the vehicle, determine a plurality of potential trajectories of the target object.

5. The vehicle of claim 4, wherein the electronic processor is further configured to determine a key trajectory of the target object from the plurality of potential trajectories of the target object, the key trajectory of the target object corresponding to the key trajectory of the vehicle.

6. The vehicle of claim 1, wherein the electronic processor is further configured to, for each of the plurality of potential trajectories of the vehicle, determine a plurality of potential trajectories of a second target object.

7. The vehicle of claim 6, wherein the electronic processor is further configured to determine a key trajectory of the second target object from the plurality of potential trajectories of the second target object, the key trajectory of the second target object corresponding to the key trajectory of the vehicle.

8. The vehicle of claim 1, wherein the electronic processor is further configured to generate a 3D histogram plotting the total number of views of the target object of the key trajectory.

9. The vehicle of claim 1, wherein the image sensor is at least one selected from a group consisting of a lidar sensor, a camera, and a radar sensor.

10. A method for collecting image data of a target object for developing a classifier, the method comprising:
    determining a plurality of potential trajectories of a vehicle including an image sensor,
    determining, for each of the plurality of potential trajectories of the vehicle, a total number of views including the target object that would be captured by the image sensor as the vehicle moved along the respective trajectory,
    determining a key trajectory of the vehicle from the plurality of potential trajectories based on the total number of views including the target of the key trajectory, and
    controlling the vehicle for movement along the key trajectory.

11. The method of claim 10, wherein the key trajectory is further selected based on a total number of different distances from the target object.

12. The method of claim 10, wherein the key trajectory is further selected based on a total number of different perspective angles of the target of the total number of views.

13. The method of claim 10, wherein determining the plurality of potential trajectories of the vehicle includes, for each of the plurality of potential trajectories of the vehicle, determining a plurality of potential trajectories of the target object.

14. The method of claim 13, the method further comprising determining a key trajectory of the target object from the plurality of potential trajectories of the target object, the key trajectory of the target object corresponding to the key trajectory of the vehicle.

15. The method of claim 10, wherein determining the plurality of potential trajectories of the vehicle includes, for each of the plurality of potential trajectories of the vehicle, determining a plurality of potential trajectories of a second target object.

16. The method of claim 15, the method further comprising determining a key trajectory of the second target object from the plurality of potential trajectories of the second target object, the key trajectory of the second target object corresponding to the key trajectory of the vehicle.

17. The method of claim 10, the method further comprising generating a 3D histogram platting the total number of views of the target object of the key trajectory.

18. The method of claim 10, wherein the image sensor is at least one selected from a group consisting of a lidar sensor, a camera, and a radar sensor.

19. A method for collecting image data of a target object for developing a classifier the method comprising:
    determining a plurality of potential trajectories of a vehicle including an image sensor,
    determining, for each of the plurality of potential trajectories of the vehicle, a total number of views including the target object that would be captured by the image sensor as the vehicle moved along the respective trajectory,
    determining a key trajectory of the vehicle from the plurality of potential trajectories based on the total number of views including the target of the key trajectory, providing instructions to a user interface for guiding the vehicle along the key trajectory, and controlling the vehicle for movement along the key trajectory.

\* \* \* \* \*

UNITED STATES PATENT AND TRADEMARK OFFICE
CERTIFICATE OF CORRECTION

PATENT NO. : 11,938,968 B2  
APPLICATION NO. : 17/523679  
DATED : March 26, 2024  
INVENTOR(S) : Luiz Ricardo Douat et al.

Page 1 of 1

It is certified that error appears in the above-identified patent and that said Letters Patent is hereby corrected as shown below:

In the Claims

Claim 17, Line 49: please replace "platting" with --plotting--

Signed and Sealed this  
Twentieth Day of May, 2025

Coke Morgan Stewart  
*Acting Director of the United States Patent and Trademark Office*